United States Patent
Liang

(10) Patent No.: US 8,375,107 B2
(45) Date of Patent: Feb. 12, 2013

(54) WEBPAGE PRE-READING METHOD, TRANSFER SERVER AND WEBPAGE PRE-READING SYSTEM

(75) Inventor: Jie Liang, Guangzhou (CN)

(73) Assignee: Guangzhou UCWeb Computer Technology Co., Ltd, Guangzhou (CN)

( * ) Notice: Subject to any disclaimer, the term of this patent is extended or adjusted under 35 U.S.C. 154(b) by 0 days.

(21) Appl. No.: 13/580,961

(22) PCT Filed: Dec. 16, 2011

(86) PCT No.: PCT/CN2011/084107
§ 371 (c)(1),
(2), (4) Date: Aug. 23, 2012

(87) PCT Pub. No.: WO2012/094937
PCT Pub. Date: Jul. 19, 2012

(65) Prior Publication Data
US 2012/0317244 A1    Dec. 13, 2012

(30) Foreign Application Priority Data
Jan. 14, 2011  (CN) .......................... 2011 1 0008500

(51) Int. Cl.
*G06F 15/16*  (2006.01)
(52) U.S. Cl. ........ 709/219; 709/218; 715/204; 715/209; 715/798
(58) Field of Classification Search ........... 709/217–219
See application file for complete search history.

(56) References Cited

U.S. PATENT DOCUMENTS

| | | | |
|---|---|---|---|
| 8,065,620 B2 * | 11/2011 | Chen et al. | 715/744 |
| 2009/0204706 A1 * | 8/2009 | Ertugrul et al. | 709/224 |
| 2012/0066359 A1 * | 3/2012 | Freeman et al. | 709/223 |
| 2012/0239731 A1 * | 9/2012 | Shyamsunder et al. | 709/203 |

FOREIGN PATENT DOCUMENTS

| | | |
|---|---|---|
| CN | 1588867 A | 3/2001 |
| CN | 102123168 A | 7/2001 |
| CN | 101325602 A | 12/2001 |
| CN | 200910313007.8 | 12/2009 |

* cited by examiner

Primary Examiner — Patrice Winder
Assistant Examiner — Tauqir Hussain
(74) Attorney, Agent, or Firm — Anova Law Group, PLLC

(57) ABSTRACT

The present invention provides a relay server-based web page pre-reading and integrated browsing method and system. The method includes: based on a page visit request sent from a mobile terminal for page data of a web page having a plurality of sub-pages, requesting the page data of the web page from a network resource server; after receiving the page data of the web page from the network resource server, performing a pre-reading process starting from the received page data of the web page and ending with pre-reading page data of a predetermined levels of sub-pages of the web page from the network resource server. By using the present invention, effective sub-pages can be flexibly obtained and the obtained sub-pages can be merged and rearranged. The web page display can be more flexible, user-friendly, and fast, reducing the user's operating processes and enhancing the user experience when browsing web pages having multiple sub-pages.

13 Claims, 3 Drawing Sheets

Page pre-reading unit 430

WEBPAGE PRE-READING METHOD, TRANSFER SERVER AND WEBPAGE PRE-READING SYSTEM

CROSS-REFERENCES TO RELATED APPLICATIONS

This application is a national stage application of PCT Application No. PCT/CN2011/084107, filed on Dec. 16, 2011, which claims the priority of Chinese patent application number 201110008500.6, filed on Jan. 14, 2011, the entire contents of all of which are incorporated herein by reference.

TECHNOLOGY FIELD

The present invention relates to the field of mobile Internet technologies and, more particularly, to a web page pre-reading method, a relay server, and a web page pre-reading system having the relay server.

BACKGROUND

With recent social progresses and technological development, more and more people are using mobile terminals to wirelessly access the network to obtain information. In the conventional web page browsing process, the user clicks on the current page to advance to a linked page, which is then loaded in real-time. However, for current ways of accessing the network through mobile terminals, especially mobile phones, because the limitations on the terminal hardware and the network interface, it might be inevitable for the user to spend 10 to 20 seconds waiting for the web page loading process, from clicking on loading the next page to completing the loading. This process may waste certain amount of the user's time and consume the user's patience. To deal with this situation, the web page pre-reading technology becomes increasingly widely-used.

For pre-reading web pages, in general the existing technologies use the following approach:

Based on historical browsing behavior of the user of the client terminal and web page layout, the server predicts which files need to be pre-loaded. When the user is browsing web pages, the web page pre-reading function can be realized by pre-loaded files. Thus, the user does not need to wait for the pages to be loaded and can quickly obtain the page contents that need to be loaded from the server.

U.S. Pat. No. 7,284,035 (B2) discloses a similar technical solution: determining certain sub-pages of a web page are obtained by the user; if it is determined, pre-reading these determined sub-pages, and the preference of the sub-pages are generated by analyzing web pages previously visited by the user. Factors used by such analysis may include the user's visiting history of sub-pages of a particular web page, number of days of the past visit, and how many sub-pages on the current page, etc. For example, when a user visits a same news site every morning and always reads articles from the politics, computer, travel, and reading columns, according to this patent application, when the news web pages were visited, these preferences will be determined, and those articles related to the politics, computer, travel, and reading columns will have higher priority than those from other columns and be loaded into the browser's cache.

However, with the existing technology, after the pre-reading of specific sub-pages, the user still needs to perform flipping operations on the sub-pages to obtain these sub-pages one by one from the cache on the client side. To the user who needs to browse the web pages with many sub-pages (such as a serial novel), although the pre-reading can reduce the user's waiting time to a certain extent, the frequent flipping operations may be still inconvenient for continuous browsing experience.

Chinese Patent Application No. 200910313007.8 discloses a web page pre-reading and integrated browsing system and application method for mobile communication terminal equipment. It uses a pre-reading module for reading sub-pages of the current web page in advance, and a web page integrating module for combining the current web page and the sub-pages into a combined web page. The pre-read page can be searched at multiple levels, and the obtained sub-pages are combined with the current web page to create an integrated web page displayed to the user, improving the user's browsing experience.

However, the pre-reading and integrating scheme disclosed by this Chinese Patent Application No. 200910313007.8 can only use a simple keyword on the web page such as "The Next Page", "The Next Chapter", or "The Next Section" as the hot point to trigger obtaining and combining relative sub-pages. For web pages with complex sub-page structures (such as serial novels with both "The Next Page" and "The Next Chapter" links), it may be unable to achieve accurate pre-reading. Further, this Chinese Patent Application No. 200910313007.8 uses a single pre-read rule, may be lack of consideration on the user's browsing preferences, and may be less user friendly.

SUMMARY OF THE INVENTION

For the above problems, the present invention provides a relay server-based web page pre-reading and integrating technology to overcome the disadvantages of the existing technologies, such as single pre-reading rule, and poor user friendliness.

According to one aspect of the present invention, a web page pre-reading method is provided, the method includes the following steps:

based on a page visit request sent from a mobile terminal for page data of a web page having a plurality of sub-pages, requesting the page data of the web page from a network resource server;

after receiving the page data of the web page from the network resource server, starting from the received page data of the web page and ending with pre-reading page data of predetermined levels of sub-pages of the web page from the network resource server, performing a pre-reading process as follows:

performing pre-read keyword analysis on the page data of the web page or page data of a pre-read sub-page returned from the network resource server;

obtaining pre-read keywords contained in the returned page data of the web page or the pre-read sub-page;

based on a pre-read keyword with the highest priority from the obtained pre-read keywords, pre-reading page data of a next sub-page of the web page or of the pre-read sub-page from the network resource server; and transmitting pre-read page data of the predetermined levels of sub-pages to the mobile terminal.

According to another aspect of the present invention, a relay server is provided, including:

a receiving unit configured to receive from a mobile terminal a page visit request sent for page data of a web page having a plurality of sub-pages and, in response to the page visit request, to receive page data of the requested page from the network resource server;

a pre-read keyword analyzing unit configured to perform pre-read keyword analysis on the page data of the web page or page data of a pre-read sub-page returned from the network resource server and to obtain pre-read keywords contained in the returned page data of the web page or the pre-read sub-page;

a page pre-reading unit configured to, based on a pre-read keyword with the highest priority from the obtained pre-read keywords, pre-read page data of a next sub-page of the web page or of the pre-read sub-page;

a determining unit configured to determine whether page data of predetermined levels of sub-pages has been read;

a transmitting unit configured to transmit the page visit request to the network resource server and to transmit the pre-read page data of the predetermined levels of sub-pages to the mobile terminal;

wherein, after receiving the page data of the web page from the network resource server, starting from the received page data of the web page, the pre-read keyword analyzing unit and the page pre-reading unit are configured to process repetitively, until the determining unit determines that page data of a predetermined levels of sub-pages of the web page are pre-read from the network resource server.

According to another aspect of the present invention, a web page pre-reading system including a mobile terminal, a network resource server, and the relay server is provided.

By using the disclosed relay server-based web page pre-reading and integrating technical solutions, effective sub-pages can be flexibly obtained and the obtained sub-pages can be merged and rearranged to, when the user is browsing a web page requiring many page flipping operations, form a same combined web page displayed to the user. Thus, all contents are rendered once on the terminal. The web page display can be more flexible, user-friendly, and fast, reducing the user's operating processes and enhancing the user experience when browsing web pages having multiple sub-pages.

Also, according to the present invention, the pre-read page multi-level searching and analyzing strategy can more accurately predict the user clicking behavior for the next time. This not only can increase the clicking response speed, but also produces less mistaken pre-reads and reduces the network traffic. At the same time, idle time can be used to download web pages, so the user basically does not have to wait. Thus, the user's time can be saved and the number of network visit requests may also be reduced.

The present invention can be used in reading network novels or news of multiple continuous pages to greatly improve mobile browser user experience.

In order to achieve the above and other related objectives, one or more aspects of the present invention include those features to be described in detail in the followings and particularly pointed out in the claims. The following descriptions and accompanying drawings describe in detail certain illustrative aspects of the present invention. However, these aspects only illustrate some of the ways in which the principle of the present invention can be used. In addition, the present invention intends to include all these aspects and their equivalents.

BRIEF DESCRIPTION OF THE DRAWINGS

By referring to the descriptions of the accompanying drawings and the claims, and with a full understanding of the present invention, other purposes and results of the present invention will be more clearly and easily understand. In the drawings:

The same label may be used in all drawings to indicate similar or corresponding feature or function.

DETAILED DESCRIPTIONS

The followings, together with accompanying drawings, describe in detail certain embodiments of the present invention.

In order to flexibly obtain effective sub-pages and to merge and rearrange the obtained sub-pages, the present invention uses a multiple sub-page merging and pre-reading solution based on keyword priority and user behavior. In addition, the pre-reading operation and the page rearranging and combining operations are performed on a relay server, and only the final step of page rendering and displaying is performed on the client side. The burden to the mobile communication terminal equipment can then be substantially reduced.

It should be noted that, in the disclosed embodiments, the term "a sub-page of a web page" is used in relative to the current page that the user is browsing. More specifically, the sub-page may be a page pointed to by a hyperlink on the current page being browsed, such as the next page hyperlink, etc.

In addition, the present invention uses a client-server architecture. Although the present embodiments use primarily a mobile terminal as web browser client side, the present invention can also be applied to access client sides other than mobile terminals (e.g., mobile phones), such as PC, special-service-providing terminals (such as query terminals in airports and railway stations,), etc. Therefore, in this disclosure, "mobile terminal," "terminal," and "client side," etc., may refer to any access client side interacting with users.

Figure 1:
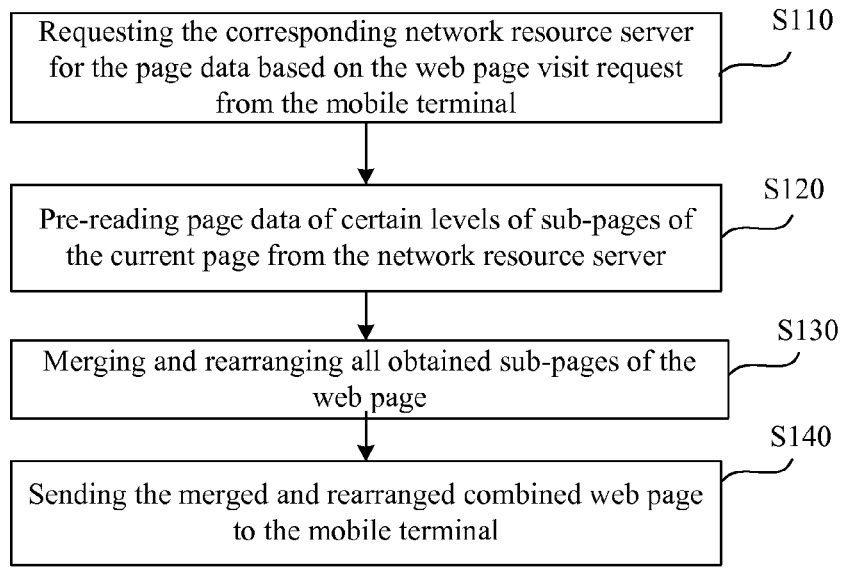
FIG. 1 shows a flow chart of a relay server-based web page pre-reading method according to the present invention.

FIG. 1 shows a flow chart of a relay server-based web page pre-reading method according to the present invention.

As shown in FIG. 1, when a mobile terminal user browses a web page, the mobile terminal submits the user's web page visit request to the relay server, and the relay server requests the corresponding network resource server for the page data based on the web page visit request from the mobile terminal (S110); After the relay server receives the page data returned from the network resource server, and starting from the page data of the current page, the relay server performs the following pre-reading operation until page data of certain levels (i.e., a predetermined number of levels) of sub-pages of the current page are pre-read from the network resource server: performing pre-read keyword analysis on the page data of the current page or the page data of the pre-read sub-page returned from the network resource server, so as to obtain pre-read keywords contained in the returned page data of the current page or the pre-read sub-page; based on a pre-read keyword with the highest priority from the obtained pre-read keywords, pre-reading page data of the next sub-page of the current page or of the next sub-page of the pre-read sub-page (S120.)

Figure 2:
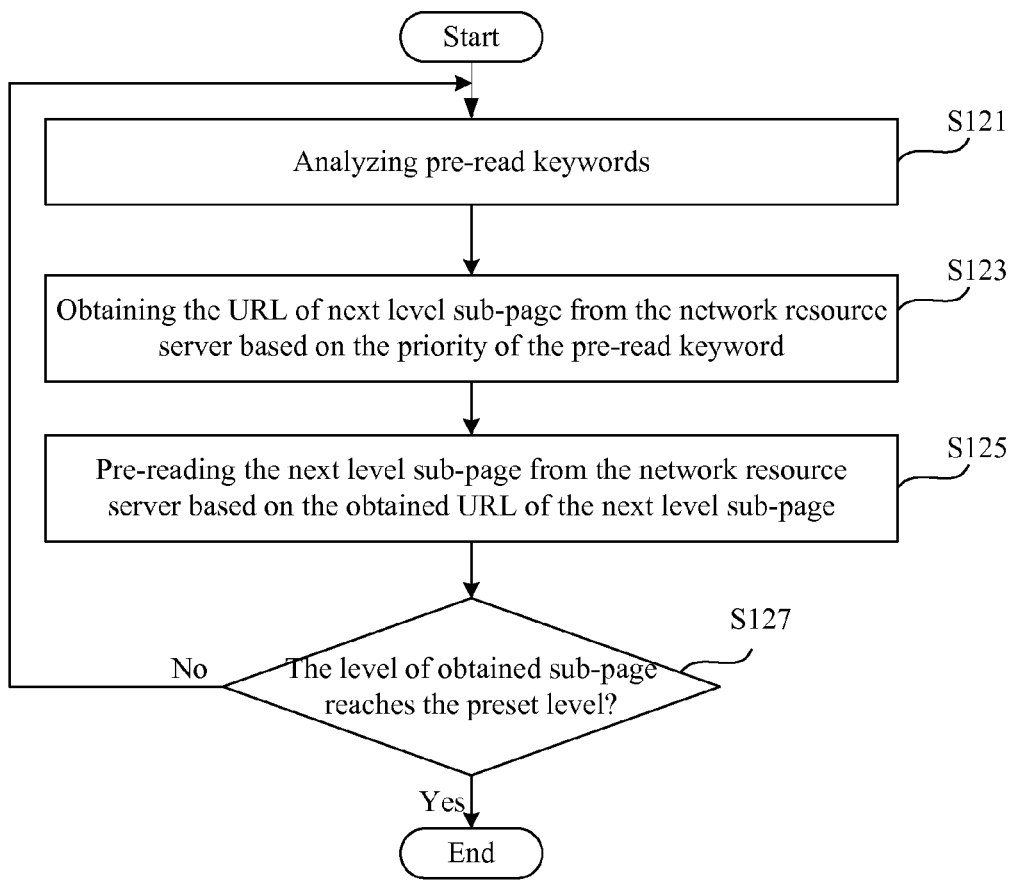
FIG. 2 shows the pre-reading process for each sub-page according to the present invention.

Specifically, for example, as shown in FIG. 2, at the beginning, the page data returned from the network resource server are analyzed for pre-read keywords (S121). Based on the priority of the pre-read keywords, the URL of the sub-page of the requested web page is obtained from the network resource server (S123). After obtaining the URL of the sub-page, the relay server pre-read the page data of the sub-page from the network resource server based on the obtained URL (S125). Further, in S127, it is determined whether page data from predetermined levels of sub-pages have been pre-read. If not all predetermined levels of sub-pages have been pre-read, returning to S121. In S121, pre-read keyword analysis is performed on page data of the currently pre-read sub-page. The processing from S121 to S127 is then repeated, until it is determined that all predetermined levels of sub-pages have been pre-read. The number of predetermined levels of sub-pages for pre-reading may be determined based on the hardware configuration of the terminal, or may be set by the user. The pre-read sub-page level during operation may be controlled by using a counter or other quantity controlling methods known to those skilled in the art.

After having pre-read all predetermined levels of sub-pages, as shown in FIG. 1, the relay server merges and rearranges the pre-read sub-pages of the predetermined number of levels to create a combined web page (S130). Finally, the merged and rearranged combined web page data is sent to the mobile terminal (S140), so as to achieve the pre-reading and integrated browsing of the web page requested by the user.

After the pre-reading and integrated browsing of the sub-pages of the user requested web page (i.e., current page) by the relay server, when the user clicks on the keyword determined based on the pre-read keyword priority or on the most frequently visited page link on the current page, the mobile terminal can directly fetch the combined web page of merged pre-read sub-pages in the cache for display. Thus, the contents of certain number of sub-pages can then be browsed without any page flipping operations.

Further, priorities of certain pre-read keywords are listed below in a descending order, from left to right, for illustrative purposes:

---

"Next Page", "[Next Page]", "The Next Page", "[The Next Page]", "Next Page|", ">>Next Page", ">>Next Page|", "The Next Sheet", "[The Next Sheet]", "[->]", ">", "[>]", "[- >>]",">>", "[>>]", "Next Chapter", "[Next Chapter]", "The Next Chapter", "[The Next Chapter]", "Next Section", "[Next Section], etc.

---

Other priority structures may also be used. When the relay server is determining the priority of keywords on a web page, the relay server selects a keyword with the highest priority, and stores the sub-page of the web page pointed to by the keyword link and any sub-page of that sub-page pointed to by the same keyword link. For example, if a news report's home page has only a summary of the news report, and the keyword on the home page with the highest priority is "Next Page", and when the news report has a total of five pages, with each page containing a keyword "Next Page" at the bottom of the page, the relay server will pre-read page 2 to page 5 of the news report as the sub-pages of the home page.

In addition to the introduction of the above-mentioned keyword priority, optionally or preferably, the mass user behavior is also considered as one of the factors for the pre-reading operation. That is, in S123, after obtaining the URL of the sub-page of the current page, further determining whether the URL of the sub-page is the same as the URL of the most frequently visited page after visiting the current page as determined by mass user behavior statistics. If the URLs are the same, continuing to S125. If the URLs are not the same, determining whether to pre-read the most frequently visited page based on the jumping visit rate of the URL of the most frequently visited page.

If the jumping visit rate exceeds a preset threshold, pre-reading the most frequently visited page based on the URL of the most frequently visited page. Otherwise, if the jumping visit rate does not exceed the preset threshold, do not perform any pre-reading operation.

In this disclosure, the mass user behavior statistics on the relay server are obtained by recording the visit behavior of all users, and calculating various statistical parameters associated with the visit behavior of all users based on these visit behavior records. For example, those behavior statistics, such as visit frequency (i.e., how many visits per day), probability of jumping from one page to another page, etc., are calculated based on the mass users' visit behavior records.

More specifically, based on statistical data of the mass users' historical visit behavior on a web page, the most frequently visited page after visiting the web page can be obtained (including sub-pages of the web page and other jumping web pages). If the URL of the sub-page of the current page, determined based on the priority of the pre-read keywords, is the same as the URL of the most frequently visited page after visiting the current page, it can be determined that users may likely wish to continuously read the news report, and all the sub-pages pre-read based on the keyword are merged and rearranged and sent to the mobile terminal afterwards to be stored in the cache.

The total number of combined sub-pages can be determined based on the hardware configuration of the terminal, or can also be set by the user independently. However, taking into account the user's browsing habits and the terminal configuration of most of mobile terminals, the levels of sub-pages to be combined are generally no more than four. Preferably, 2 to 3 levels of sub-pages are merged and rearranged in certain embodiments.

If the pre-read sub-page based on the priority of the keyword is different from the most frequently visited page after visiting the web page, the jumping visit rate of the most frequently visited page after visiting the web page is determined based on the mass user historical visit behavior and is used to decide whether to pre-read the jumping visit page. The threshold value of the jumping visit rate may be determined based on experience or historical data, such as a number between 60% to 80%. In one embodiment, if the jumping visit rate of the web page reaches 70% or above, the most frequently visited page is pre-read; if the jumping visit rate of the web page does not reach 70%, no subsequent pre-reading is performed.

Such mass user behavior statistics comparison and determination may be used only for pre-reading the first level of sub-page, or may be used for pre-reading every level of sub-pages by comparing the URL of the sub-page with the URL of the jumping visit page obtained by mass user behavior statistics, such that every page pre-read by the relay server may closely fit the user's browsing needs.

More specifically, as an example, followings describe the process of, when pre-reading every level of sub-pages, comparing the URL of the sub-page with the URL of the jumping visit page obtained by mass user behavior statistics. Each time after obtaining the URL of a sub-page, determining whether the URL of the sub-page is the same as the URL of the most frequently visited page after visiting the previous page of the sub-page as obtained by the mass user behavior statistics. If the URLs are the same, continuing to the pre-reading operation in above-mentioned S125. Otherwise, determining whether to pre-read the most frequently visited page based on the jumping visit rate of the URL of the most frequently visited page using the mass user behavior statistics. Similarly, if the jumping visit rate exceeds a preset threshold, pre-reading the most frequently visited page using the URL of the most frequently visited page. If the jumping visit rate does not exceed the preset threshold, no pre-reading operation is performed, and the already pre-read sub-pages are merged and rearranged.

The followings describe the relay server-based web page pre-reading and integrated browsing method using two specific embodiments of the present invention for illustrative purposes.

Specific Embodiment One

With respect to web page layout design, for each sub-page with same or similar contents, the page structure of each sub-page may be the same: the sub-pages may use the same markup language, use the same page title, etc. Thus, this characteristic may be used to combine and rearrange these sub-pages. More particularly, each sub-page can be separated into a title part and a body part. The body part of each sub-page is then extracted and the extracted body parts of the sub-pages are combined to form the body part of the newly combined web page, while the title part of the newly combined web page is the common portion of the title parts of the sub-pages. The entire contents of the newly combined web page can then be outputted directly when the user is browsing.

Figure 3:
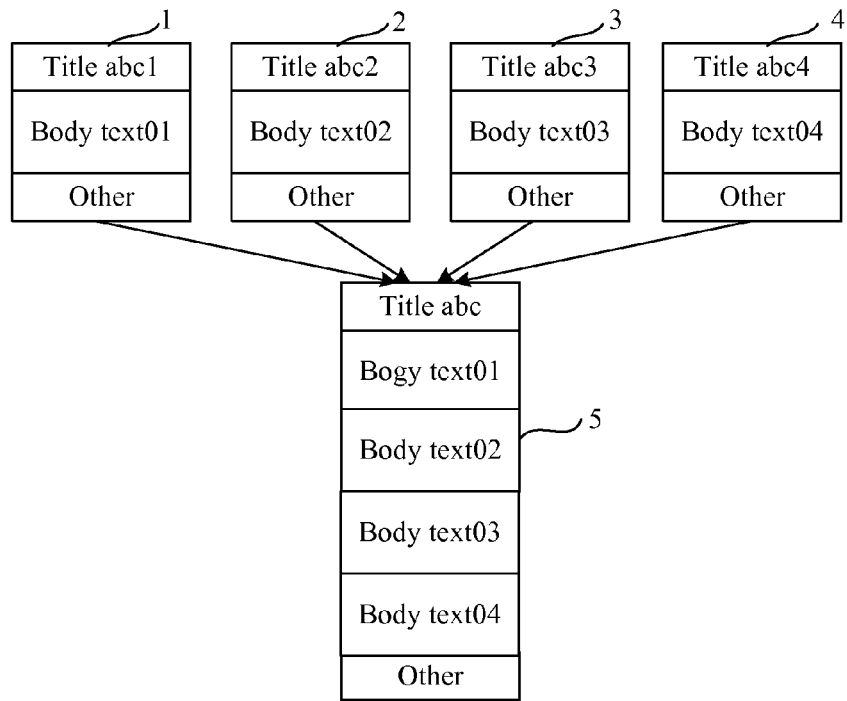
FIG. 3 shows a structure diagram for combining and rearranging sub-pages of same structure according to the present invention.

FIG. 3 illustrates a simple structural diagram for merging and rearranging sub-pages with same structure. As shown in FIG. 3, assuming that the user is currently browsing the page "Pagef", and its sub-page are sub-page 1, sub-page 2, sub-page 3, and sub-page 4.

The body part of the sub-page 1 is "text01", and the title is "abc1";

The body part of the sub-page 2 is "text02", and the title is "abc2";

The body part of the sub-page 3 is "text03", and the title is "abc3";

The body part of the sub-page 4 is "text04", and the title is "abc4";

The relay server obtains and stores the sub-page 1 to sub-page 4 by pre-reading operation. After calculating the mass user behavior statistics, the relay server determines that the historical user visit behavior statistics indicate that the most frequently visited page after visiting the current page "Pagef" is sub-page 1. Thus, the relay server combines all sub-pages of the page "Pagef" and merges and rearranges all the sub-pages into the combined web page 5.

As shown in FIG. 3, after the combination and rearrangement, the body part of the combined web page 5 is a combination of the body parts of sub-page 1, sub-page 2, sub-page 3, and sub-page 4. That is, the body of the combined web page 5 is: text01, text02, text03, and text04 combined continuously. The title of the combined web page 5 is the common portion from the titles of sub-page 1, sub-page 2, sub-page 3, and sub-page 4, which is "abc." After the completion of the combination and rearrangement, the relay server sends the combined web page 5 to the client side.

When the user clicks on the hyperlink "The Next Page" on the current page "Pagef", the client side will render and display the combined web page 5. Thus, the user does not have to perform the tedious page flipping operation, while still can access more browsing contents linked with the current page, greatly improving the browsing experience.

Specific Embodiment Two

With respect to web pages associated with network serial novels, because novels have chapters and sections, links on these web pages capable of triggering pre-reading operation not only include "The Next Page", but also may simultaneously include "The Next Section", "The Next Chapter", and even "The Next Volume". When multiple hot point pre-read keywords exist at the same time, the priority of the keywords on the web page may need to be determined first.

For example, for web pages of a particular network novel, the priority of "The Next Page" is higher than the priority of "The Next Chapter"; and the priority of "The Next Chapter" is higher than the priority of "The Next Volume". If the user is reading the first page of the second chapter (assuming there are 7 pages in the second chapter), based on the priority of the keywords and after obtaining the first page, the relay server pre-reads the second page to the seventh page of the second chapter. The relay server then analyzes the most frequently visited page by all users after visiting the first page (mass user behavior statistics). If the most frequently visited page is the second page, the relay server merges and rearranges the contents of the 7 pages or the contents of page 2 to page 4, and sends the combined contents to the cache of the mobile terminal. When the user clicks on the keyword "The Next Page", the mobile terminal directly fetch the cached combined web page for display. If the relay server, based on the analysis, determines that the most frequently visited page by all users after visiting the first page is not the second page, but the third last page of the last chapter, the relay server then pre-reads the third last page of the last chapter and certain sub-pages of the third last page, until the level of pre-read sub-pages reaches the predetermined number. The relay server then merges and rearranges all pre-read pages and sends the combined web page to the mobile terminal. That is, if the most frequently visited page is a sub-page, at a same or different level, of the current page or with the same contents, the jumping visit rate may be unchecked. If the relay server, based on the analysis, determines that the most frequently visited page by all users after visiting the first page is not the second page or any page of this novel, but another page with unrelated contents, and the relay server also determines that the jumping visit rate from the page of the network novel to the page with unrelated contents reaches 70%, the relay server then pre-reads the page with unrelated contents and its sub-pages and performs web page merging and rearranging and sends the combined contents to the mobile terminal.

According to the present invention, during the merging process, the similarity between the sub-pages is usually taken into account. The merging and rearranging process may be performed by analyzing the URLs of the sub-pages and, of course, by analyzing the degree of similarity among the sub-page layouts.

Thus, in the disclosed pre-reading logic or rules, there are two types of pre-reading, keyword-based pre-reading and statistics-based (mass user behavior statistics) pre-reading. In general, the priority of the keyword-based pre-reading is higher than the priority of the statistics-based pre-reading. In above disclosed embodiments, the keyword-based pre-reading is used. That is, for those pages having pre-read keyword (s), the keyword-based pre-reading is given priority; for those pages having no pre-read keyword(s), pre-reading is performed based on the mass user behavior statistics from the relay server.

The above disclosure, with reference to FIG. 1 and FIG. 2, describes the relay server-based web page pre-reading and integrated browsing method. This relay server-based web page pre-reading and integrated browsing method may be implemented in software, hardware, or a combination of software and hardware.

Figure 4:
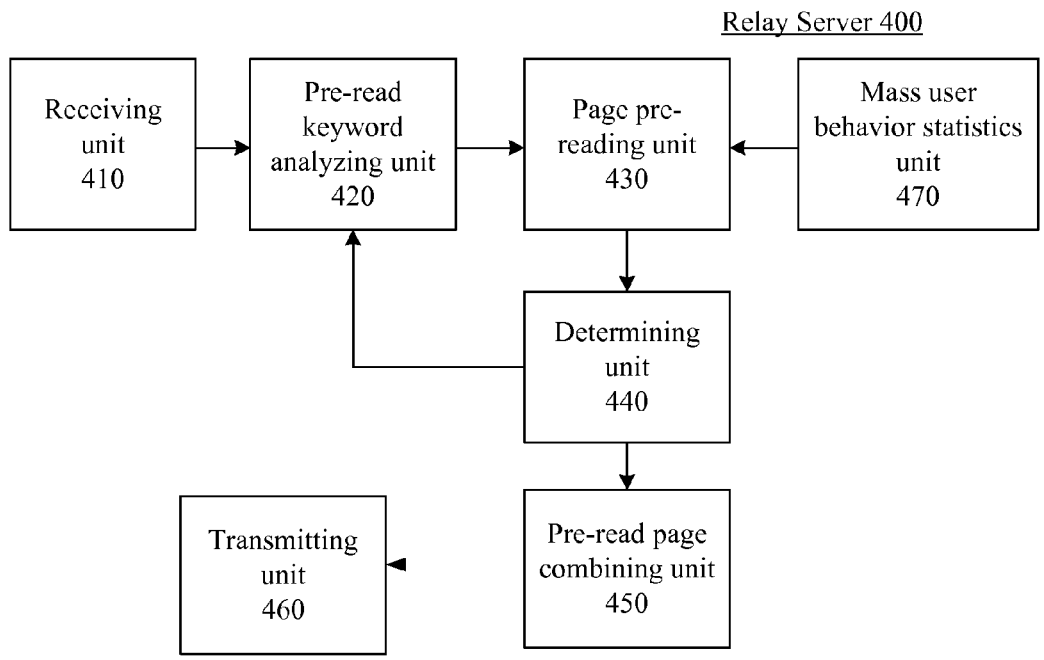
FIG. 4 shows a block diagram of a web pages pre-reading relay server according to the present invention.

Corresponding to the above described method, one aspect of the present invention also provides a relay server for web page pre-reading and integrated browsing. FIG. 4 illustrates a block diagram of a relay server 400 for web page pre-reading. As shown in FIG. 4, configured for web page pre-reading, the relay server 400 includes a receiving unit 410, a pre-read keyword analyzing unit 420, a page pre-reading unit 430, a determining unit 440, a pre-read page combining unit 450, and a transmitting unit 460.

Among them, the receiving unit 410 is configured to receive from the mobile terminal a page visit request for page data of a web page having multiple sub-pages. The receiving unit 410 is also configured to, in response to the page visit request, receive page data of the requested page from the network resource server.

The pre-read keyword analyzing unit 420 is configured to perform pre-read keyword analysis on the page data of the current page or the page data of the pre-read sub-page returned from the network resource server, so as to obtain pre-read keywords contained in the returned page data of the current page or the pre-read sub-page. Further, page pre-reading unit 430 is configured to, based on a pre-read keyword with the highest priority from the obtained pre-read keywords, pre-read page data of the next sub-page of the current page or of the next sub-page of the pre-read sub-page from the network resource server.

The determining unit 440 is configured to determine whether page data from predetermined levels of sub-pages have been pre-read. After the relay server 400 receives the page data returned from the network resource server, and starting from the page data of the current page, the relay server 400 repeats the processing by the pre-read keyword analyzing unit 420 and the page pre-reading unit 430, until the determining unit 440 determines that page data of all predetermined levels of sub-pages have been pre-read from the network resource server. Further, pre-read page combining unit 450 is configured to merge and rearrange the page data of the predetermined number of levels of sub-pages pre-read by the page pre-reading unit 430. The transmitting unit 460 transmits the merged and rearranged combined web page data to the mobile terminal.

Figure 5:
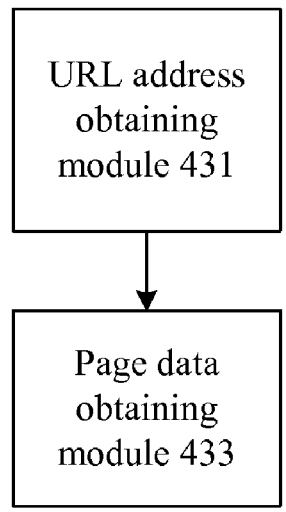
FIG. 5 shows a block diagram of a page pre-reading unit according to the present invention.

In one embodiment, as shown in FIG. 5, the page pre-reading unit 430 may also include: a URL address obtaining module 431 for, based on the pre-read keyword with the highest priority in the pre-read keywords obtained by the pre-read keyword analyzing unit 420, obtaining the URL of the sub-page to be pre-read from the network resource server; and a page data obtaining module 433 for, based on the obtained URL address, obtaining the sub-page data to be pre-read from the network resource server.

In the pre-read keyword analyzing unit 420, priorities of the pre-read keywords may be set as: "Next Page", "[Next Page]", "The Next Page", "[The Next Page]", "Next Page|", ">>Next Page", ">>Next Page|", "The Next Sheet", "[The Next Sheet]", "[→]", ">", "[>]", "[→>]", ">>", "[>>]", "Next Chapter", "[Next Chapter]", "The Next Chapter", "[The Next Chapter]", "Next Section", "[Next Section], etc.

Referring to both FIG. 4 and FIG. 5, the relay server may pre-read sub-page level by level, as follows: based on the URL of the sub-page and the priority of the pre-read keyword, the page data obtaining module 433 in the page pre-reading unit 430 pre-reads the first level sub-page from the network resource server. Afterwards, the pre-read keyword analyzing unit 420 analyzes the first level sub-page and obtains pre-read keywords contained in the first level sub-page. Further, based on the priority of the pre-read keywords, the page data obtaining module 433 in the page pre-reading unit 430 obtains the URL of the next level sub-page of the first level sub-page from the network resource server. Then, the page pre-reading unit 430 continues to pre-read the next level sub-page from the network resource server based on the URL of the next level sub-page, followed by the pre-read keyword analyzing unit 420 continuing to analyze the next level sub-page, and so son, until the predetermined number levels of sub-pages have been pre-read.

Taking into account the user's browsing habits and the terminal configuration of most of mobile terminals, the levels of sub-pages to be combined are generally no more than four. Preferably, 2 to 3 levels of sub-pages are merged and rearranged.

In order to make pre-read page more in line with the user's browsing intention, in one embodiment of the present invention, the mass user behavior is also included in the factors to be considered for pre-reading operation. That is, the relay server 400 also includes a mass user behavior statistics unit 470, which is configured to, based on mass users' web page browsing behavior, statistically calculate the historical visit behavior to each web page, visit frequency, and jumping visit rate, etc. The mass user behavior statistics unit 470 records visit behaviors of all users, and calculates various statistical parameters associated with these visit behaviors, such as visit frequency (i.e., how many visits per day), probability of jumping from one page to another page, etc. These parameters are statistically calculated based on the mass users' visit behavior records.

In addition, the relay server 400 may also include a determining unit (not shown) configured to, after the URL address obtaining module 431 obtains from the network resource server the URL address of the sub-page to be pre-read, determine whether the obtained URL address is the same as the URL of the frequently visited page after visiting the web page obtained by the mass user behavior statistics unit 470. If the URLs are the same, the data obtaining module 433 in the page pre-reading unit 430 obtains the page data of the sub-page to be pre-read from the network resource server, based on the URL of the sub-page of the previously pre-read page or sub-page.

If the URLs are not the same, the page pre-reading unit 430 may perform the pre-reading operation based on the jumping visit rate of the URL of the most frequently visited page. If the jumping visit rate exceeds a preset threshold, the page pre-reading unit 430 uses the URL of the most frequently visited page as the URL of the sub-page from the network resource server and obtains the page data from that URL. Otherwise, if the jumping visit rate does not exceed the preset threshold, the page pre-reading unit 430 does not perform any pre-reading operation.

Figure 6:
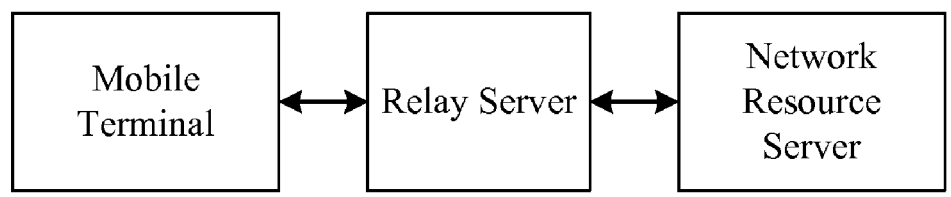
FIG. 6 shows a block diagram of a web page pre-reading system according to the present invention.

The threshold value of the jumping visit rate may be determined based on experience or historical data, such as a number between 60% to 80%. In one preferred embodiment, the threshold value may be set to approximately 70%. That is, if the jumping visit rate of the web page reaches 70% or above, the most frequently visited page is pre-read; if the jumping visit rate of the web page does not reach 70%, no subsequent pre-reading is performed Further, the present invention also provides a web page pre-reading system containing the mobile terminal, the network resource server, and the above mentioned web page pre-reading system, a block diagram of which is shown in FIG. 6.

It should be noted that, the above disclosed embodiments are merely illustrative and not intended to be limiting. Those skilled in the art understand that various modifications can be made from these embodiments.

For example, to illustrate this aspect, the merging and rearranging process in FIG. 1 can be omitted. Similarly, the pre-read page combining unit 450 and the mass user behavior statistics unit 470 in FIG. 4 can also be omitted.

In addition, when pre-reading page data of the sub-page of the current page or sub-page from the network resource server, based on the pre-read keyword with the highest priority among the obtained pre-read keywords, other known methods in this field can also be used in addition to the methods disclosed in the above embodiments.

According to the present invention, the combination of keyword priority and mass user behavior analysis, the selection of the web page to be pre-read fitting the user's browsing intention, and the merge and rearrangement of multiple pre-read pages not only allow a terminal user to browse more web page contents without the need to flip pages many times, but also greatly improve the degree of user satisfaction. Thus, the user's web browsing experience is more effectively enhanced.

In addition, the disclosed methods may be implemented in CPU-executable computer programs. When executed by the CPU, the computer programs perform the functions of the disclosed methods.

In addition, the above method steps and system units can be realized by a controller or processor, and by computer-readable storage medium storing computer programs capable of making the controller or processor to implement the above method steps or system units.

In addition, it should be understood that the computer-readable storage medium (e.g., memory) can be volatile memory or nonvolatile memory, or can include volatile memory and nonvolatile memory. As a non-limiting example, nonvolatile memory can include read-only memory (ROM), programmable ROM (PROM), electrically programmable ROM (EPROM), electrically erasable programmable ROM (EEPROM), or flash memory. Volatile memory can include random access memory (RAM), the RAM can act as external cache memory. As another non-limiting example, the RAM can be obtained in various forms such as synchronous RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). It is intended that the disclosed storage medium is including but not limited to these and other suitable types of memory.

Those skilled in the art will also understand that, the disclosed logic blocks, modules, circuits, and algorithm steps can be implemented in electronic hardware, computer software, or a combination thereof. In order to clearly illustrate this interchangeability between hardware and software, functions of a variety of schematic components, boxes, modules, circuits, and steps are generally described. Whether the functions are implemented in software or hardware depends on the specific application and design constrains applied to the entire system. Those skilled in the art can, for each specific application, use a variety of ways to realize the described functions. However, such realization decision should not be interpreted as departing from the scope of the present invention.

The various illustrative logic blocks, modules, and circuits described here can be designed to use the following components performing the disclosed functions: general-purpose processor, digital signal processor (DSP), application specific integrated circuits (ASICs), field programmable gate array (FPGA) or other programmable logic device, discrete gate or transistor logic, discrete hardware components, or any combination of these components. General-purpose processor can be a microprocessor or, alternatively, the processor can be any conventional processor, controller, microcontroller or state machine. The processor can also be a combination of computing devices, such as a combination of DSP and microprocessors, multiple microprocessors, one or more microprocessors integrated with a DSP core, or any other such configuration.

The disclosed methods or algorithm steps may be embodied in hardware, software modules executed by the processor, or a combination of both. The software module can reside in RAM memory, flash memory, ROM memory, EPROM memory, EEPROM memory, registers, hard disk, removable disk, the CD-ROM, or any other form of storage medium known in the field. The storage medium can be coupled to the processor, such that the processor can read information from the storage medium and write information to the storage medium. Alternatively, the storage medium can be integrated with the processor. The processor and the storage medium may reside in an ASIC. The ASIC can reside in the user terminal. Also alternatively, the processor and the storage medium may reside as discrete components in the user terminal.

The above describes the exemplary web page pre-reading and integrated browsing methods and systems in reference to the accompanying drawings. Those skilled in the art would understand that various improvements can be made the basis of the disclosed web page pre-reading and integrated browsing methods and systems without departing from the contents of the present invention. The scope of the present invention should be defined by the specification, drawings, as well as the attached claims.

The invention claimed is:

1. A web page pre-reading method, comprising:
based on a page visit request sent from a mobile terminal for page data of a web page having a plurality of sub-pages, requesting the page data of the web page from a network resource server;
after receiving the page data of the web page from the network resource server, starting from the received page data of the web page and ending with pre-reading page data of a predetermined levels of sub-pages of the web page from the network resource server, performing a pre-reading process as follows:
performing pre-read keyword analysis on the page data of the web page or page data of a pre-read sub-page returned from the network resource server;
obtaining pre-read keywords contained in the returned page data of the web page or the pre-read sub-page;
based on a pre-read keyword with the highest priority from the obtained pre-read keywords, pre-reading page data of a next sub-page of the web page or of the pre-read sub-page;
merging and rearranging the pre-read predetermined number of levels of sub-pages; and
transmitting merged and rearranged combined web page data of the predetermined levels of sub-pages to the mobile terminal.

2. The web page pre-reading method according to claim 1, wherein the step of, based on a pre-read keyword with the highest priority from the obtained pre-read keywords, pre-reading page data of a next sub-page of the web page or of the pre-read sub-page further includes:

based on the pre-read keyword with the highest priority from the obtained pre-read keywords contained in the received page data of the web page or the pre-read sub-page, obtaining from the network resource server a URL address of the next sub-page to be pre-read; and based on the obtained URL address, pre-reading the page data of the next sub-page from the network resource server.

3. The web page pre-reading method according to claim 2, wherein, after obtaining from the network resource server the URL address of the next sub-page to be pre-read, the method further includes:

determining whether the URL of the next sub-page is the same as a URL address of a most frequently visited page after visiting the web page or the pre-read sub-page based on mass user behavior statistics;

when the URLs are the same, obtaining the page data of the next sub-page of the web page or the pre-read sub-page from the network resource server based on the URL address of the next sub-page of the web page or the pre-read sub-page;

when the URLs are not the same, determining whether to pre-read the most frequently visited page based on a jumping visit rate of the URL of the most frequently visited page.

4. The web page pre-reading method according to claim 3, wherein when the jumping visit rate exceeds a preset threshold, pre-reading the most frequently visited page based on the URL of the most frequently visited page; and when the jumping visit rate does not exceed the preset threshold, not performing any pre-reading operation.

5. A relay server, comprising:

a receiving unit configure to receive from a mobile terminal a page visit request for page data of a web page having a plurality of sub-pages and, in response to the page visit request, to receive page data of the requested page from the network resource server;

a pre-read keyword analyzing unit configured to perform pre-read keyword analysis on the page data of the web page or page data of a pre-read sub-page returned from the network resource server and to obtain pre-read keywords contained in the returned page data of the web page or the pre-read sub-page;

a page pre-reading unit configured to, based on a pre-read keyword with the highest priority from the obtained pre-read keywords, pre-read page data of a next sub-page of the web page or of the pre-read sub-page from the network resource server;

a determining unit configured to determine whether page data of a predetermined levels of sub-pages has been read;

a pre-read page combining unit configured to merge and rearrange the pre-read predetermined number of levels of sub-pages;

a transmitting unit configured to transmit the page visit request to the network resource server and to transmit the merged and rearranged combined web page data of the predetermined levels of sub-pages to the mobile terminal;

wherein, after receiving the page data of the web page from the network resource server, starting from the received page data of the web page, the pre-read keyword analyzing unit and the page pre-reading unit are configured to process repetitively, until the determining unit determines that page data of a predetermined levels of sub-pages of the web page are pre-read from the network resource server.

6. The relay server according to claim 5, wherein the page pre-reading unit further includes:

a URL address obtaining module configured to, based on the pre-read keyword with the highest priority from the obtained pre-read keywords contained in the received page data of the web page or the pre-read sub-page, obtain from the network resource server a URL address of the next sub-page to be pre-read; and a page data obtaining module configured to, based on the obtained URL address, pre-read the page data of the next sub-page from the network resource server.

7. The relay server according to claim 6, further including:

a mass user behavior statistics unit configured to, based on web page browsing behavior of mass users, statistically calculate user's historical visit behavior of each page, visit frequency, and jumping visit rate; and a determining unit configured to, after the URL address obtaining unit obtains from the network resource server the URL address of the next sub-page to be pre-read, determine whether the obtained URL is the same as a URL of a most frequently visited page after visiting the web page obtained by the mass user behavior statistics unit, wherein:

when the obtained URL is the same as the URL of the most frequently visited page obtained by the mass user behavior statistics unit, the page pre-reading unit is further configured to obtain the page data of the next sub-page from the network resource server based on the URL address of the next sub-page of the web page or the pre-read sub-page;

when the obtained URL is different from the URL of the most frequently visited page obtained by the mass user behavior statistics unit, the page pre-reading unit is further configured to perform pre-reading operation based on a jumping visit rate of the URL of the most frequently visited page.

8. The relay server according to claim 7, wherein:

when the jumping visit rate exceeds a preset threshold, the page pre-reading unit is further configured to pre-read the most frequently visited page from the network resource server based on the URL of the most frequently visited page; and when the jumping visit rate does not exceed the preset threshold, the page pre-reading unit is further configured not to perform any pre-reading operation.

9. A web page pre-reading system, comprising a mobile terminal, a network resource server, and a relay server according to claim 5.

10. A web page pre-reading system, comprising a mobile terminal, a network resource server, and a relay server according to claim 6.

11. A web page pre-reading system, comprising a mobile terminal, a network resource server, and a relay server according to claim 7.

12. A web page pre-reading system, comprising a mobile terminal, a network resource server, and a relay server according to claim 8.

13. A web page pre-reading system, comprising a mobile terminal, a network resource server, and a relay server according to claim 5.

* * * * *